United States Patent [19]
Bridges et al.

[11] Patent Number: 5,927,680
[45] Date of Patent: Jul. 27, 1999

[54] RATE GYRO ISOLATION ASSEMBLY

[75] Inventors: Timothy E. Bridges; Morton Markowitz, both of Huntington Beach; Gary Quan, Fountain Valley; Bob Shaw, Westminster; Lawrence W. Treybig, Santa Ana; Timothy J. Voorheis, Lakewood; Randolph J. Zorkocy, Irvine, all of Calif.

[73] Assignee: McDonnell Douglas Corporation, Huntington Beach, Calif.

[21] Appl. No.: 08/886,345

[22] Filed: Jul. 1, 1997

[51] Int. Cl.⁶ ........................................ F16M 1/00
[52] U.S. Cl. ..................... 248/638; 248/581; 248/671
[58] Field of Search ................... 248/560, 562, 248/581, 610, 611–613, 638, 671, 672, 674, 675, 678, 580; 267/136

[56] References Cited

U.S. PATENT DOCUMENTS

| | | | |
|---|---|---|---|
| 3,057,592 | 10/1962 | Thrasher | 248/358 |
| 3,151,833 | 10/1964 | Thrasher | 248/358 |
| 4,099,696 | 7/1978 | Toome | 248/358 R |
| 4,162,778 | 7/1979 | Kraft | 248/610 |
| 4,270,393 | 6/1981 | Osborne et al. | 74/5 F |
| 4,531,701 | 7/1985 | Treu | 248/676 |
| 4,605,194 | 8/1986 | Binnig et al. | 248/559 |
| 4,618,111 | 10/1986 | Sherwood et al. | 244/158 R |
| 4,688,909 | 8/1987 | Smith | 350/631 |
| 4,713,714 | 12/1987 | Gatti et al. | 360/137 |
| 4,754,827 | 7/1988 | Hirabayashi | 180/68.5 |
| 4,771,644 | 9/1988 | Meron | 74/5.22 |
| 4,890,812 | 1/1990 | Chechile et al. | 248/674 |
| 5,138,903 | 8/1992 | Grossenbacher, Jr. et al. | 74/606 R |
| 5,348,284 | 9/1994 | Ishihama et al. | 271/160 |

*Primary Examiner*—Ramon O. Ramirez
*Assistant Examiner*—Gwendolyn Baxter
*Attorney, Agent, or Firm*—Harness, Dickey & Pierce, P.L.C.

[57] ABSTRACT

A gyro isolation assembly (10) is provided including a cradle (24) having a base (26) and a plurality of reinforcement wall portions extending therefrom (28, 30). A first bracket (50) is provided for supporting a first end of the cradle (24) in a suspended manner and a second bracket (50) is provided for supporting a second end of the cradle (24) in a symmetrical suspended manner. The center of the cradle assembly is attached to the mounting surface, forming the primary fixed attach point (43). Each end is then attached to the surface via the brackets (50) that allow compliance in one direction, but are stiff in the other two directions. A mounting structure (12) is provided for supporting a gyro therein. The mounting structure is suspended between the reinforcement wall portions (28) of the cradle (24). A plurality of isolators (34) are disposed between the mounting structure (12) and the cradle (24).

13 Claims, 3 Drawing Sheets

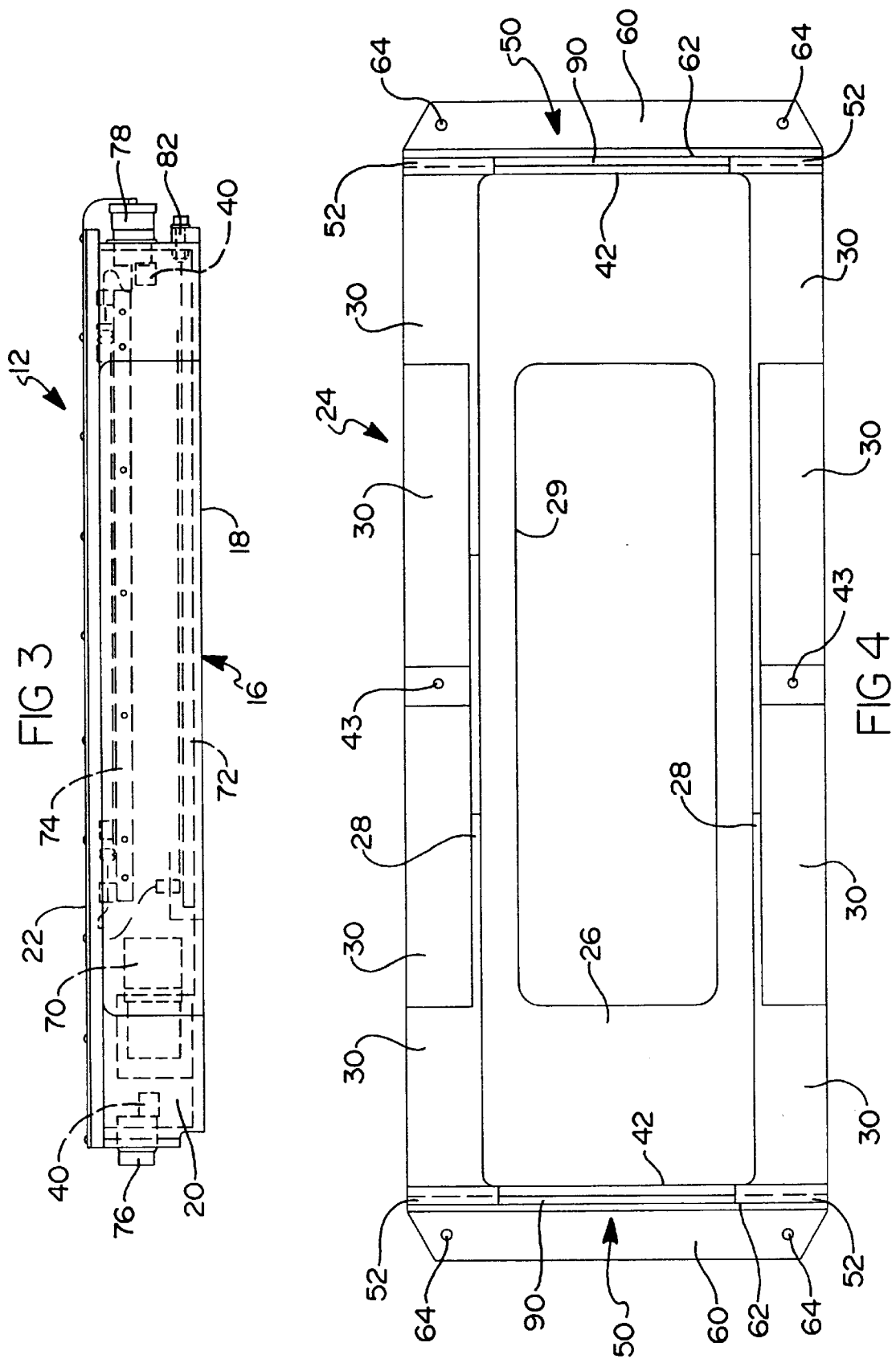

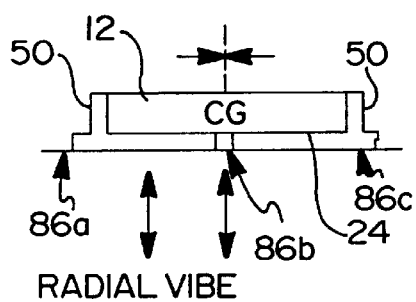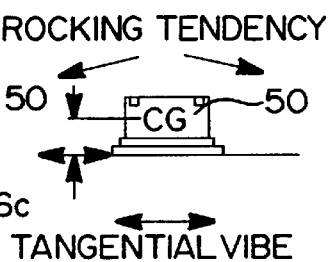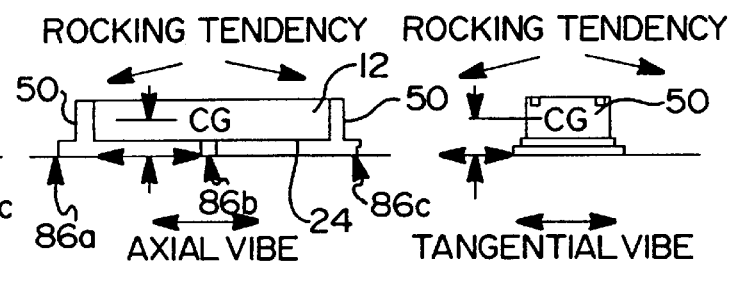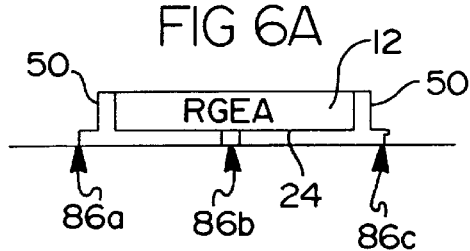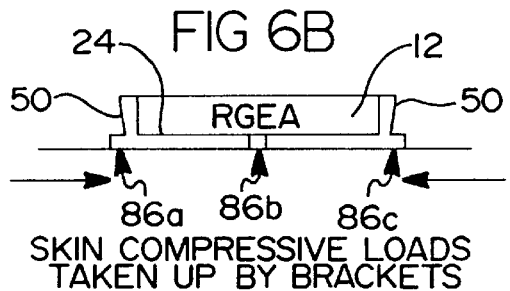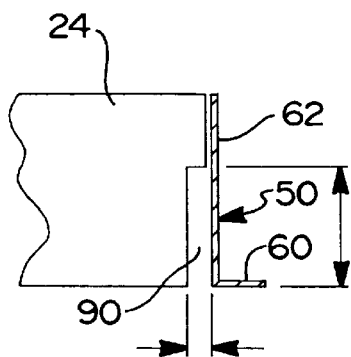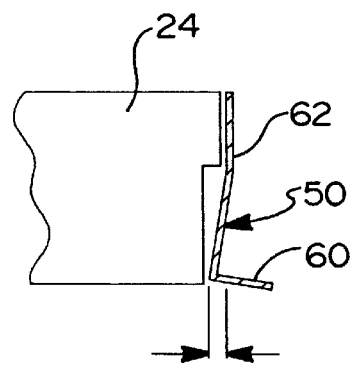

RATE GYRO ISOLATION ASSEMBLY

BACKGROUND OF THE INVENTION

1. Technical Field

The present invention relates to vibration isolation systems, and more particularly, an assembly which isolates a gyroscope from mounting surface vibratory heat expansion, and/or contraction-induced rotational displacements.

2. Background Art

A wide variety of torque-producing devices make use of spinning rotor elements mounted on low-friction bearings. Among such devices are gyroscopes which have many applications in the aerospace industry. Gyroscopes are used, for example, in airplanes, torpedoes, and missiles as a basic element in automatic steering systems to "remember" the orientation of the horizon and the direction of north during maneuvers. Such torque-producing devices are generally mounted on a support structure. It has been found that for many applications, it is desirable to isolate the gyroscopes and the support structure from the vibrations and other extraneous dynamic motions of the base on which it is mounted so as to help reduce potential rotational discrepancies.

In many systems and devices in current use, it is desirable to isolate a support structure from vibrations as well as to help ensure that the support structure maintains a constant angular orientation with respect to a predetermined reference surface. For example, the support structure of an inertial navigation system often is mounted within a vehicle whose position is to be determined in such a manner that vibrations of the vehicle which may be transmitted to the support structure do not adversely affect gyro operation and also in such a manner that the support structure experiences no rotational movement with respect to the vehicle, or, in other words, the angular orientation of the support structure with respect to the vehicle is continually maintained. The isolating requirements of a support structure becomes clear when it is realized that the gyroscopes in the accelerometer which are mounted on the platform rectify high frequency vibration applied thereto so that an output signal is generated by these components in response to vibratory displacement whereby the accuracy of the navigational system is affected. Further, unless the angular orientation for the support structure is maintained, inaccurate rotation rates will be sensed, thereby severely limiting the accuracy of the system.

Several exemplary isolation and mounting assemblies are disclosed in U.S. Pat. Nos. 3,057,592 issued to Thrasher; U.S. Pat. No. 3,151,833 issued to Thrasher; U.S. Pat. No. 4,099,696 issued to Toome; U.S. Pat. No. 4,270,393 issued to Osborne et al; U.S. Pat. No. 4,531,701 issued to Treu; U.S. Pat. No. 4,618,111 issued to Sherwood et al; U.S. Pat. No. 4,688,909 issued to Smith; U.S. Pat. No. 4,771,644 issued to Meron; U.S. Pat. No. 4,890,812 issued to Chechile et al; and U.S. Pat. No. 5,138,903 issued to Grossenbacher, Jr., et al.

DISCLOSURE OF INVENTION

The assembly of the present invention improves the accuracy of the vehicle angular rate inputs to the gyro electronics assembly resulting from the response of the installation to the low frequency dynamics of a vehicle mounting surface. These dynamics result from tension/compression due to mounting surface bending, and thermal expansion/contraction, as well as tension due to tank pressurization and tension or compression due to aerodynamic loading (e.g., in the case of launch vehicles).

The rate gyro electronics assembly is intended to respond to rigid body motion and body bending as reflected at the theoretical vehicle centerline. The output of the rate gyro electronics assembly is used by the control system to help stabilize the vehicle. The first bending mode of the vehicle is low in frequency and is therefore often difficult to distinguish from the actual vehicle directional changes. Signal filtering can attenuate responses to excitation at frequencies higher than the first bending mode, i.e., vibration and higher order bending modes. However, signal filtering cannot effectively remove the lowest frequency dynamic response. Doing so would also remove the first bending mode response that the rate gyro electronics assembly is supposed to measure. Low frequency dynamic responses take the form of alternating tension, compression, and bending of the skin surface upon which the rate gyro electronics assembly is mounted. These local responses are a consequence of vehicle bending, thermal effects and tank pressurization effects. Therefore, it is desirable to isolate local skin surface effects from the rate gyro electronics assembly in order to improve performance.

The gyro isolation assembly of the present invention includes few parts and has a small center of gravity offset for obtaining reduced overturning moments.

The assembly of the present invention utilizes elastomeric isolators which effectively damp out vibration energy.

The assembly of the present invention uses a beam-like construction which is attached at a center portion and which allows longitudinal displacement of each end through the use of flexures. The flexures of the isolation assembly accommodate longitudinal (thrust axis) forced deflections placed upon the assembly by complying in that direction thereby reducing fastener load.

The assembly, according to the present invention, thereby isolates the gyro electronics assembly from a hot or cold mounting surface.

The gyro isolation assembly of the present invention includes a cradle having a base and a plurality of reinforcement wall portions extending therefrom. A first bracket is provided for supporting a first end of the cradle in a suspended manner and a second bracket is provided for supporting a second end of the cradle in a suspended manner. A mounting structure is provided for supporting a gyro therein. The mounting structure is suspended between the reinforced wall portions of the cradle. A plurality of isolators are disposed between the mounting structure and the cradle. The assembly provides a symmetrical design of the installation hardware, coupled with a center attach point that essentially breaks the response into two equal halves.

The mounting surface tension, compression, and bending effects will operate uniformly over the length of the cradle. Since the cradle is fixed in the center, any motion will drive each end of the cradle equally. Each end of the cradle body employs identical angle brackets that flex in the axial direction to take up tank skin surface motion. Since the geometry of the brackets is the same, the loads they impart to each side of the cradle body will be the same. The cradle body is also symmetrical about the center, where it is fixed to the mounting surface, so any response to the brackets will be symmetric about the center. The rate gyro electronics assembly is suspended from each end of the cradle body, via four elastomeric isolators such that the center of gravity is coincident with the elastic center of the isolator system. This way, as each end of the cradle body responds symmetrically to the mounting surface, the rate gyro electronics assembly will remain parallel to the tangent to the skin at the center attach point. This represents the average angular deflection of the vehicle where the rate gyro electronics assembly is located. Wire harness interfaces to the suspended gyro instrument should be compliant with respect to the isolators so as not to dynamically short them out. Also, the mass of the interfacing connectors and suspended wire harnesses are considered when determining the center of gravity.

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF DRAWINGS

The present invention will become more fully understood from the detailed description and the accompanying drawings, wherein:

FIG. 3 is a side view of a rate gyro electronics assembly used in conjunction with the isolation assembly of the present invention;

FIG. 4 is a plan view of the cradle according to the present invention;

FIG. 5A is a schematic illustration of the radial vibrations which are isolated by the isolation assembly of the present invention;

FIG. 5B is a schematic illustration of the axial vibrations and rocking tendency that are isolated by the isolation assembly of the present invention;

FIG. 5C is a schematic illustration of the tangential vibrations and rocking tendency which are isolated by the isolation assembly of the present invention;

FIGS. 6A and 6B illustrate the skin compressive loads taken up by the angle brackets according to the principles of the present invention; and FIGS. 7A and 7B illustrate in more detail the deflection of the angle brackets according to the principles of the present invention.

DETAILED DESCRIPTION OF THE INVENTION

Figure 1:
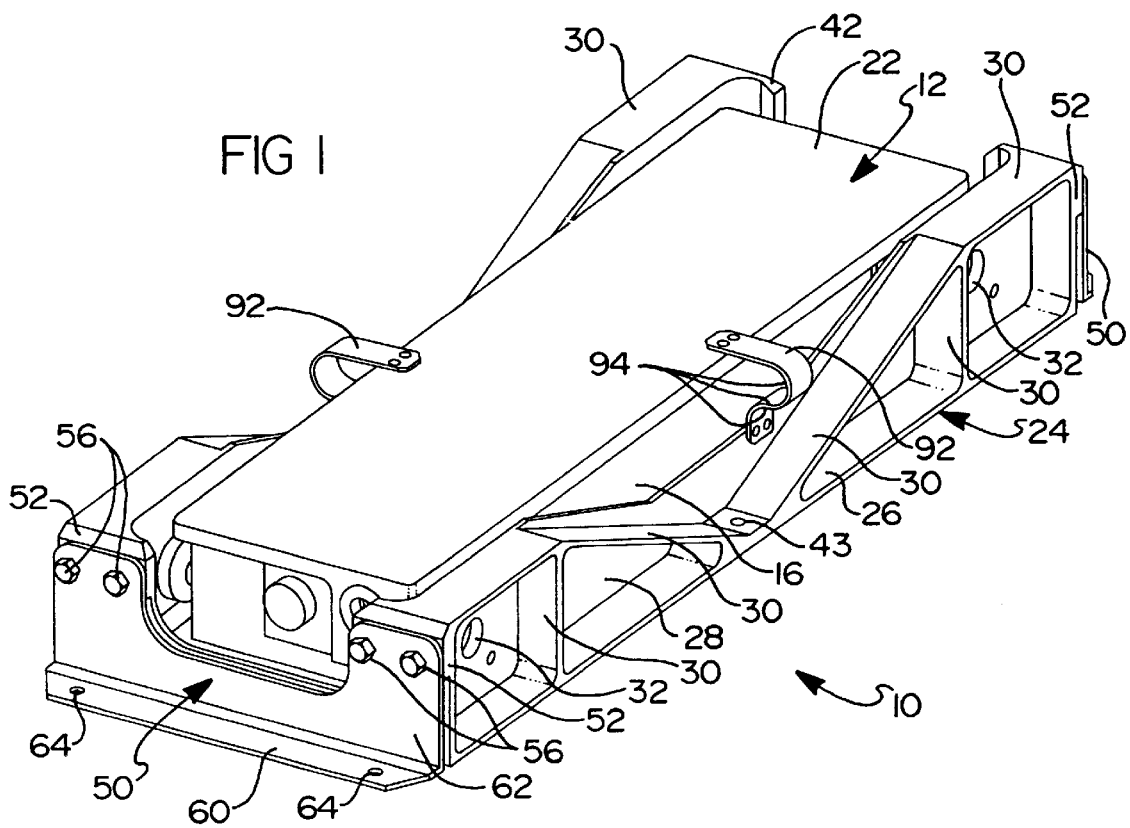
FIG. 1 is a perspective view of the isolation assembly according to the principles of the present invention.
Figure 2:
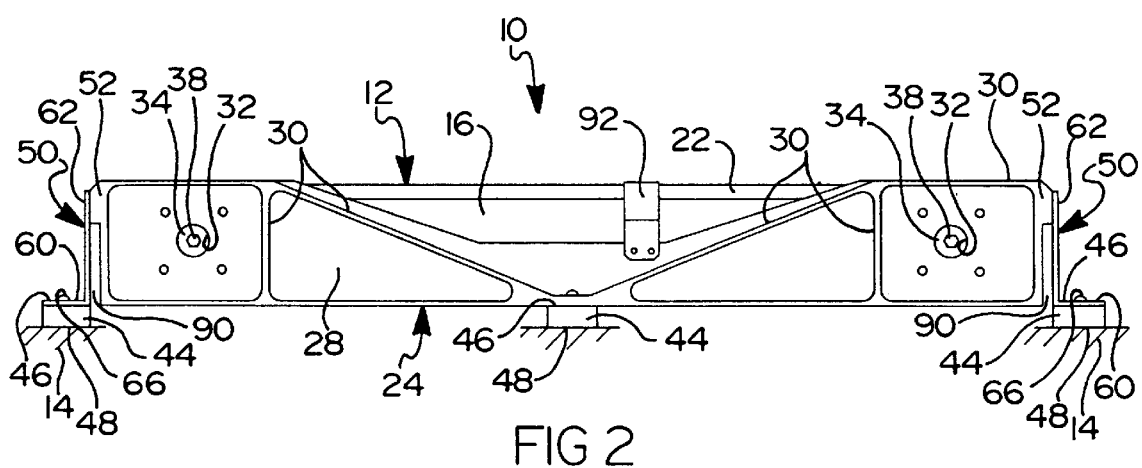
FIG. 2 is a side view of the isolation assembly shown in FIG. 1.

With reference to FIGS. 1–4, the isolation assembly 10 of the present invention will now be described. The isolation assembly 10 is designed to reduce the potential for undesirable rate inputs to the rate gyro electronics assembly 12 due to low frequency dynamics of the surface 14 upon which the isolation assembly 10 is mounted. The surface 14 can generally include a tank skin of a launch vehicle or any mounting surface of the vehicle. The rate gyro electronics assembly 12 includes an elongated box 16 having a base portion 18, four sidewalls 20, and a cover 22, as best shown in FIG. 3. The box 16 is suspended by a cradle 24.

The cradle 24 includes a base 26 and a pair of sidewall portions 28. Base 26 can be provided with an opening 29 through a central portion thereof for weight reduction. The sidewall portions 28 are provided with vertical, horizontal and diagonal reinforcement braces 30 for strengthening the sidewalls 28 for the purpose of stiffening the cradle 24 to increase its natural frequency. A plurality of symmetrically disposed apertures 32 are provided in the sidewalls 28. Each of the apertures 32 accommodate an elastomeric isolator 34 having a central opening for receiving a fastener 38 which is inserted into an encapsulated nut plate 40 which is housed within the box 16 of the gyro electronics assembly 12. Cradle 24 further includes a pair of end wall portions 42. Base 26 is provided with a pair of longitudinally central apertures 43 which receive a fastener for fastening the cradle 24 to surface 14.

Depending on the configuration of the surface 14 to which the cradle 24 is mounted, standoff brackets 44 may be utilized having a generally flat surface 46 for engaging the isolation assembly 10 and having a second surface 48 which mates to the configuration of the surface 14 to which the isolation assembly 10 is mounted.

The isolation assembly 10 includes first and second angle brackets 50 which are fastened to the end walls 42 of the cradle. The angle brackets 50 are preferably fastened to a protruding flange portion 52 of the ends walls 42 by threaded fasteners 56. However, other known fastening means including welding and rivets may be utilized, provided clearance 90 is maintained to accommodate bracket deflection, and the attachment allows no slippage or creep. The angle brackets 50 are generally L-shaped including a base portion 60 and a vertical portion 62 extending generally perpendicular to the base portion 60. The base portion 60 is provided with a pair of mounting holes 64 for mounting the angle brackets either directly or indirectly (via standoff brackets 44) to the surface 14 of the vehicle via fasteners 66. The angle brackets 50 preferably have an L-shaped geometry which has been found to be advantageous in allowing the brackets 50 to be flexible along the longitudinal axis while being stiff in the vertical and tangential axes, as will be discussed herein. The material should provide the strength necessary to survive many cycles of vibration-induced deflection. A preferred material is type 301 half hard steel. Furthermore, it is preferable to provide a low bend radius between the base portion 60 and the vertical portion 62 so that a low moment arm is maintained. However, a large enough radius should be utilized so as not to overstress the material.

The gyro electronics assembly 12 includes at least one gyro 70 mounted to the base 18 of the box 16. According to one embodiment, gyro 70 is a single-axis gyro which is known in the art as a rate gyro. A power supply circuit board 72 and a signal conditioning circuit board 74 are provided inside the box 16 for this embodiment, but may be outside the suspended portion. Each of the circuit boards 72, 74 are connected to the rate gyro 70 and to the rear and forward connectors, 76, 78, respectively. As is well known to those skilled in the art, the connectors 76, 78 can be located on the side walls or on the top or bottom of box 16. The box 16 is provided with a radiused bottom which eases the installation of the gyro electronics assembly 12 to the cradle 24. The box 16 can be designed to accommodate a balance weight 82 at predetermined locations in order to adjust the center of gravity of the gyro electronics assembly 12 to the dimensional center of the rectangle formed by the four isolation mounts. This may or may not correspond to the dimensional center of the box 16. The box 16 is suspended at its four corners symmetrically about the center of gravity (CG) thereof. The box 16 and isolation assembly 10 are preferably elongated since a longer box better averages any local deformations in the surface 14 of the vehicle, and is more aerodynamic for a rocket application.

The isolation assembly 10 and gyro electronics assembly 12 are subjected to radial vibration, axial vibration and tangential vibration as illustrated in FIGS. 5A–5C, respectively. These definitions relate to this particular embodiment (rocket application). Furthermore, these figures illustrate the cradle rocking modes that can be introduced by radial, axial, and tangential vibrations which are taken into consideration in the present design. Radial vibration (FIG. 5A) imparts energy through the six attachment points 86a–86c (two at the center (43) and two at each end (64)) of the cradle. The attachment points 86a–86c are symmetrically disposed about the center of gravity CG of the cradle assembly 24, ensuring that rocking modes will not be introduced into the cradle since no moment arm is created by a center of gravity offset with respect to the forcing function. Further, rocking modes will not be introduced into the gyro electronics assembly 12 because its center of gravity mounted to the cradle assembly via dynamically matched isolators 34.

Axial vibration also acts through the six attachment points 86a–86c, which are offset from the cradle assembly center of gravity CG by a small moment arm, as shown in FIG. 5B. This moment arm would tend to cause fore/aft rocking about the center attach points 86b, alternatively placing the vertical leg 62 of each angle bracket 50 in tension and compression. This tendency is resisted by a very stiff assembly whose natural frequency should be at least three times that of the isolators 34. Accordingly, the brackets 50 are designed to be very stiff in the vertical direction.

Tangential vibration tends to cause side-to-side rocking of the assembly 24, as shown in FIG. 5C. Again, the cradle stiffness resists this, however, the cradle is least stiff in this direction. In general, the stiffness of the cradle assembly 24 is what resists rocking and causes the natural frequency to be higher. The frequency of the cradle modes should be several times that of the isolators 34 that suspend the gyro electronics assembly 12 in order to preclude dynamic coupling. In particular, the natural frequency of the cradle 24 should be at least three times that of the isolators 34 so that the coupling effect with the isolators is minimized. Additionally, the output axes of the gyros should be perpendicular to the direction of tangential vibration and parallel to the plane of vibration so that rocking is about that axis. Cradle assembly 10 should avoid rocking modes that coincide with gyro resonances (spin motor, ball complement). Also, cradle assembly 10 should ensure the response time of the gyro capture loop is not exceeded by the rocking frequency about the output axis.

The angle brackets 50 of the present invention accommodate thrust axis deflection by complying with mounting surface 14 loads as shown in FIGS. 6A and 6B. The brackets 50 are preferably designed to accommodate deflection caused by thermal contraction and expansion of the cradle 24 as well as the surface 14 to which it is mounted. The temperature variance between the vehicle members can be several hundred degrees fahrenheit. Accordingly, the maximum forced deflection of the angle bracket should be designed to accommodate the thermal effects. Furthermore, the gap 90 between the edge of the bracket 50 and the end walls 42 of the cradle body 24 (as defined by the flange portion 52) should be provided with a clearance margin in order to accommodate the forced deflection. Furthermore, the material used for the angle brackets 50 should be sufficient to withstand the bending stress imparted on the brackets 50 due to the deflection. Accordingly, a yield strength for the materials should be sufficient.

When the mounting surface 14 compresses, the brackets 50 flex toward the cradle body 24 and the vertical member 62 of the bracket 50 will undergo tension, as illustrated in FIGS. 7A and 7B. Since the cradle 24 is symmetrical, the tension on each side is expected to be equal or symmetric, and the cradle 24 will not rotate about its center attach point 86b. The tension load on the brackets 50 will be taken up by the cradle body 24 and deflection of angle brackets 50, as illustrated in FIG. 7B. When the tank surface 14 stretches, the brackets 50 will pass neutral and undergo tension with a similar symmetric effect.

Electrical bond straps 92 are provided for grounding the gyro electronics assembly 12 to the cradle 24 which is directly bonded to mounting surface 14. The bonding straps 92 are exposed to generally translational dynamic motion of the isolated gyro assembly. Accordingly, the bond straps 92 are preferably made from a conductive material which is high strength, yet pliable, so as to short out the isolators. For example, a Be/Cu can be used. The bond straps 92, as shown, are provided with three large equal bend radii 94 in order to help distribute the stresses evenly across the material thereby minimizing the potential for fatigue. However, it should be understood that other configurations can be utilized to achieve the same result. The bond straps 92, as shown, are fastened to the sidewall 28 of the cradle 24 and to the cover 22 of the box 16 of the gyro electronics assembly 12. Bond straps 92 should be positioned about the center of gravity as best as possible.

In summary, the isolation assembly 10 of the present invention accommodates large forced deflections due to thermal changes and structural dynamics of the gyro box mounting surface 14 without imparting undesirable rate inputs to the gyros 70. The isolation assembly 10 thermally isolates the electronics 12 from the cryogenic temperature mounting surface 14 by utilization of stainless steel brackets 50, small surface contact areas, and elastomeric isolators 34 which result in poor thermal conductivity. Broad temperature range isolators are recommended to maintain predictable vibration isolation while providing thermal isolation.

The isolation assembly 10 isolates the electronics in the gyro electronics assembly 12 from vibration using a gravity centered, or isocentric, isolation system. The reinforcement ribs 30 of the cradle 24 not only provide stiffness and load bearing functions, but also provide a large surface area to facilitate heat transfer from warm surrounding air to the structure should the assembly 10 be mounted on a cryogenic surface. Also, it is generally preferred to machine or form the cradle body from a single solid piece of material to minimize weight and maximize stiffness, thereby maximizing natural frequency.

The isolation assembly 10 of the present invention can be used with any vehicle that uses a gyro for control system stabilization. The assembly can also be used with large missiles and large space structures that exhibit low frequency first bending modes that are close to the control frequency.

The assembly of the present invention provides a totally symmetric design, attached in the center for axial, tangential, and radial loads but with angle brackets 50 disposed on the ends that flex in the axial direction to accommodate forced deflections while being stiff in the tangential and radial directions to resist rocking. The angle brackets and cradle are stiff enough to prevent dynamic coupling with the isolators 34. The angle brackets 50 are preferably made from a stainless steel for thermal isolation, while elastomeric isolators 34 are also used for thermal and vibrational isolation.

Although the invention has been described with particular reference to certain embodiments thereof, variations and modifications can be effected within the spirit and scope of the following claims.

What is claimed is:

1. A gyro isolation assembly for isolating a gyro from vibrational forces experienced by a surface of a vehicle with which said gyro is operably associated, said assembly, comprising:
   a cradle having a base and a plurality of wall portions extending therefrom;
   a first bracket supporting a first end of said cradle in a suspended manner relative to a surface, and a second bracket supporting a second end of said cradle in a suspended manner relative to said surface;
   a mounting structure adapted for supporting said gyro therein, said mounting structure including a box having a plurality of sidewalls adapted to further enclose an electronics assembly; and
   a plurality of isolators disposed between said mounting structure and said cradle for suspending said mounting structure between said wall portions of said cradle above said base.

2. The isolation assembly according to claim 1, wherein said first and second brackets are generally L-shaped and include a base portion and an upright portion extending generally perpendicular to said base portion, said upright portions of said brackets being fastened to said first and second ends of said cradle.

3. The isolation assembly according to claim 2, wherein said first and second brackets are made of a high strength yet relatively non-thermally conductive material.

4. The isolation assembly according to claim 1, further comprising at least one bond strap attached between said mounting structure and said cradle.

5. The isolation assembly according to claim 1, wherein said box having a base, and a cover, said box being adapted to support said gyro therein, said box further being adapted to enclose the electronics assembly associated with said gyro.

6. The isolation assembly according to claim 5, wherein said box is provided with a plurality of through holes for receiving a threaded member inserted through an opening in a corresponding one of said isolators.

7. The isolation assembly according to claim 6, wherein said isolators are fastened to said wall portions of said cradle.

8. The isolation assembly according to claim 7, wherein said isolators are disposed symmetrically about a center of gravity of said mounting structure.

9. The isolation assembly according to claim 1, wherein a longitudinally central portion of said cradle is provided with at least one aperture for receiving at least one fastener therethrough.

10. A method of isolating a gyro on an aircraft, comprising the steps of:
    mounting a gyro and an associated electronics assembly in a support structure comprising a box;
    using a plurality of isolators to suspend said support structure between a plurality of sidewalls of a cradle member, wherein said isolators are disposed between said support structure and said sidewalls of said cradle member at a plurality of corners of said support structure; and
    suspending said cradle member at first and second ends from a pair of brackets secured fixedly to a surface of said aircraft.

11. The method according to claim 10, further comprising the step of fastening a center portion of said cradle to said aircraft.

12. An assembly for use in isolating a gyro and a gyro electronics assembly disposed on a vehicle, comprising:
    a support structure comprising a box, said support structure being adapted to be supported by a surface of said aircraft and being adapted to house said gyro and an electronics assembly within said box;
    a cradle member having a base and a plurality of wall portions extending therefrom for suspending said support structure said cradle member having at least one central attachment point for attachment to said support structure;
    a pair of brackets attached to opposite ends of said cradle member for supporting a first end and a second end of said cradle member in a suspended manner relative to a surface of said vehicle; and
    a bond strap coupled to said support structure and said cradle member for grounding said electronics assembly.

13. The assembly according to claim 12, wherein said pair of brackets are generally L-shaped and include a base portion and an upright portion extending generally perpendicular to said base portion, said upright portions of said brackets being fastened to first and second ends of said cradle member.

* * * * *

UNITED STATES PATENT AND TRADEMARK OFFICE
CERTIFICATE OF CORRECTION

PATENT NO. : 5,927,680
DATED : July 27, 1999
INVENTOR(S) : Bridges et al

It is certified that error appears in the above-identified patent and that said Letters Patent is hereby corrected as shown below:

Column 4, Line 23, "ends" should be --end--.

Column 5, Line 17, after "because" insert --of--.

Column 5, Line 17, after "gravity" insert --being--.

Column 6, Line 15, after "material" insert --72--.

Column 7, Line 2, claim 5, after "base," insert --four sidewalls--.

Signed and Sealed this

Fourteenth Day of March, 2000

Attest:

Q. TODD DICKINSON

Attesting Officer

Commissioner of Patents and Trademarks